US009315367B2

United States Patent
Ooga et al.

(10) Patent No.: US 9,315,367 B2
(45) Date of Patent: Apr. 19, 2016

(54) COORDINATED TRANSPORT ROBOT SYSTEM

(71) Applicant: KABUSHIKI KAISHA TOSHIBA, Minato-ku, Tokyo (JP)

(72) Inventors: Junichiro Ooga, Kanagawa (JP); Hideki Ogawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/522,973

(22) Filed: Oct. 24, 2014

(65) Prior Publication Data

US 2015/0142249 A1 May 21, 2015

(30) Foreign Application Priority Data

Nov. 20, 2013 (JP) .................................. 2013-239552

(51) Int. Cl.

| | |
|---|---|
| *G01C 22/00* | (2006.01) |
| *G05B 19/418* | (2006.01) |
| *G01N 23/04* | (2006.01) |
| *B66F 9/075* | (2006.01) |
| *B66F 9/06* | (2006.01) |

(52) U.S. Cl.
CPC .............. *B66F 9/07577* (2013.01); *B66F 9/063* (2013.01); *Y10S 901/01* (2013.01)

(58) Field of Classification Search
USPC ................................ 701/23; 700/248; 378/57
See application file for complete search history.

(56) References Cited

U.S. PATENT DOCUMENTS

| 5,019,762 A * | 5/1991 | Kato .............................. 700/247 |
| 2007/0140821 A1* | 6/2007 | Garon et al. ................... 414/618 |
| 2011/0166703 A1* | 7/2011 | Byrne ........................... 700/246 |

(Continued)

FOREIGN PATENT DOCUMENTS

| JP | 2000-42958 A | 2/2000 |
| JP | 2006-070928 A | 3/2006 |
| JP | 2006-181674 A | 7/2006 |
| JP | 2009-6415 A | 1/2009 |

OTHER PUBLICATIONS

Hirata, et al.; "Handling a Single Object by Multiple Mobile Manipulators without Using Geometric Relations among Robots"; vol. 23, No. 1, pp. 139-146, 2005.

(Continued)

*Primary Examiner* — Thomas G Black
*Assistant Examiner* — Tyler Paige
(74) *Attorney, Agent, or Firm* — Amin, Turocy & Watson LLP; Gregory Turocy (57) ABSTRACT

A coordinated transport robot system according to an embodiment includes: first and second robots each including a mobile unit and a movement control unit; first and second position error absorption mechanisms provided on the first and second robots; an impedance model estimating an external force from the amount of displacement detected by the passive element unit; an external force estimating unit estimating respective external forces acting on the first and second robots based on external forces estimated with a dynamics model and estimated by the impedance model; a compliance model calculating respective position correction amounts of the first and second robots to make an external force zero; and a movement command calculating unit calculating movement commands to the first and second robots based on the position correction amounts. Each of the movement control units control the respective mobile units based on the respective movement commands.

11 Claims, 6 Drawing Sheets

(56) References Cited

U.S. PATENT DOCUMENTS

| | | | |
|---|---|---|---|
| 2011/0255663 A1* | 10/2011 | Roy et al. | 378/57 |
| 2013/0245823 A1* | 9/2013 | Kimura et al. | 700/248 |
| 2014/0303814 A1* | 10/2014 | Burema et al. | 701/3 |
| 2015/0142249 A1* | 5/2015 | Ooga et al. | 701/23 |

OTHER PUBLICATIONS

Kume, et al.; "Object Handling by Coordinated Multiple Mobile Manipulators Without Force/Torque Sensors"; Journal of Robotics and Mechatronics, vol. 20, No. 3, 2008, pp. 394-402.

* cited by examiner

B-B SECTION
FIG. 2C

A-A SECTION
FIG. 2B

C-C SECTION
FIG. 2D

COORDINATED TRANSPORT ROBOT SYSTEM

CROSS-REFERENCE TO RELATED APPLICATION

This application is based upon and claims the benefit of priority from the prior Japanese Patent Application No. 2013-239552, filed on Nov. 20, 2013, the entire contents of which are incorporated herein by reference.

FIELD

Embodiments described herein relate generally to coordinated transport robot systems.

BACKGROUND

In an indoor environment that has a complicated structure and bottleneck portions, such as a reactor building in a nuclear power plant, tasks of transporting long and heavy objects such as pipes, shields, and protection sheets for maintenance works are carried out by workers. In a high-radiation area, however, workers are not allowed to work for a long period of time. Therefore, realization of operations by remote-controlled robots is expected.

As a coordinated transport operation to be performed by robots, there is a first example in which an industrial vertical articulated robot arm is mounted on a movable carriage, and the reaction forces mutually acting on the robots are absorbed by performing force control. In the first example, if the transport object is a rigid object, the spaces between the robots are restricted to some degree, and accordingly, the errors in the distances between the robots can be absorbed in the movement range of the arm. Meanwhile, a second example related to coordinated transport is also known.

As the articulated robot arm used in the first example has multiple degrees of freedom, the articulated robot arm can absorb not only position errors but also posture errors. However, the load on the system, such as the weight and power consumption, becomes large. Furthermore, the responsiveness to control is normally not high. Meanwhile, a mechanism formed only with passive elements is simple and is light in weight, but does not have a very high tolerance to posture errors.

The second example discloses a coordinated transport method involving more than one mobile robot. However, the mobile robots are limited to those of an independent-two-wheel type, and furthermore, an internal force generated by a transport object is measured with a force sensor. Since a force sensor breaks down when subjected to a large moment such as impact, the transport method according to the second example is not suitable for transporting heavy objects.

DETAILED DESCRIPTION

A coordinated transport robot system according to an embodiment includes: first and second robots each including a mobile unit and a movement control unit configured to control the mobile unit; first and second position error absorption mechanisms provided on the first and second robots, respectively, each of the first and second position error absorption mechanisms including a top panel onto which a transport object to be placed and fixed, a passive element unit configured to rotationally move the top panel in a horizontal direction and detect an amount of displacement of rotational movement, and an active element unit configured to translationally move the top panel in the horizontal direction and detect an amount of displacement of translational movement; an impedance model configured to estimate an external force from the amount of displacement detected by the passive element unit; an external force estimating unit configured to estimate respective external forces acting on the first and second robots based on an external force estimated with a dynamics model based on the amount of displacement detected by the active element unit, and an external force estimated by the impedance model; a compliance model configured to calculate respective position correction amounts of the first and second robots to make an external force zero, the external force being estimated by the external force estimating unit; and a movement command calculating unit configured to calculate movement commands to the first and second robots based on the position correction amounts calculated by the compliance model; wherein the movement control units of the first and second robots control the respective mobile units based on the respective movement commands calculated by the movement command calculating unit.

The following is a description of embodiments, with reference to the accompanying drawings. In the drawings, like components are denoted by like reference numerals. However, the drawings are merely schematic, and specific sizes should be determined by taking the following description into account. It goes without saying that there are differences in size and ratio among the drawings.

Figure 1:
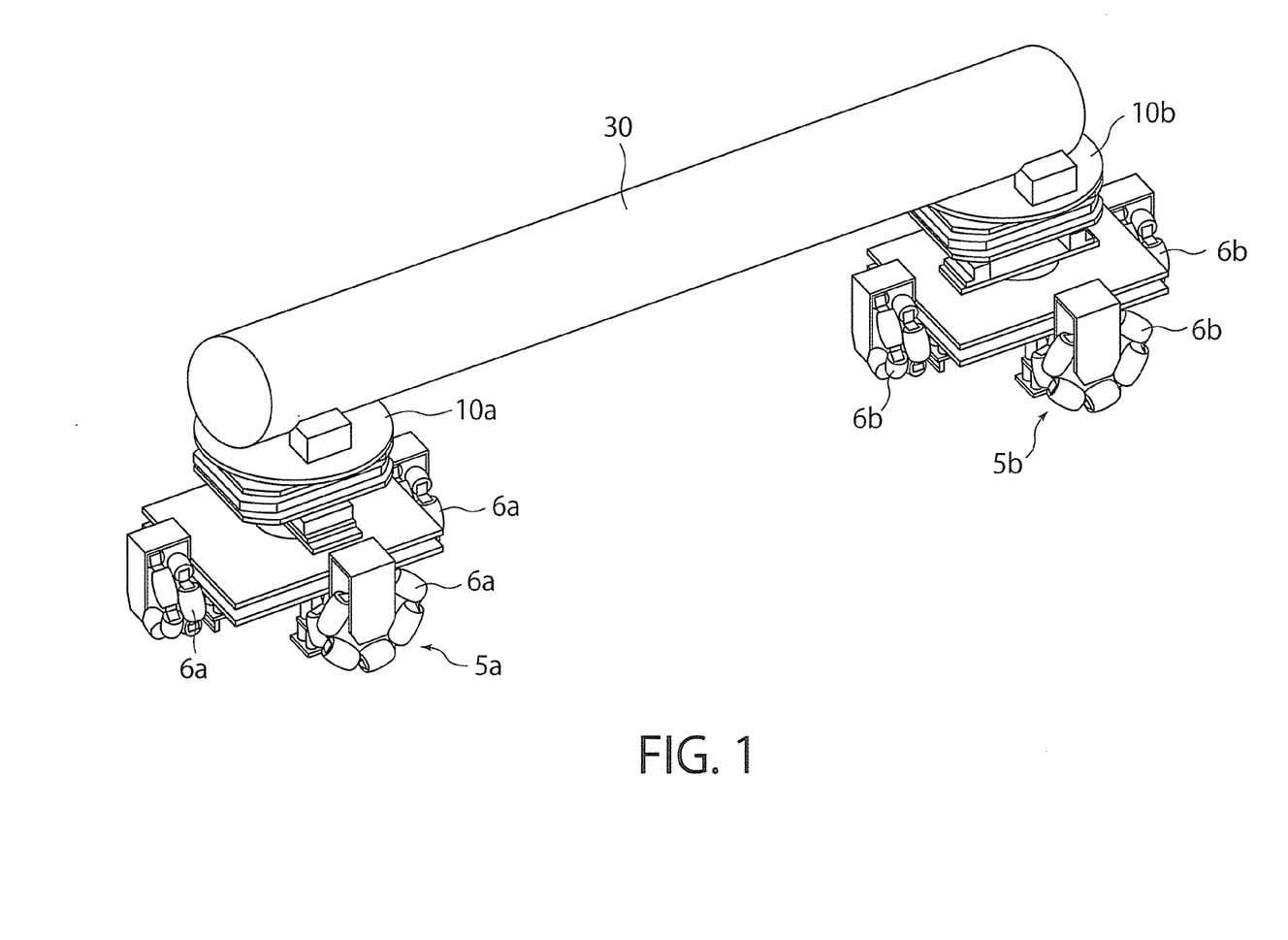
FIG. 1 is a perspective view of a coordinated transport robot system according to an embodiment.

A coordinated transport robot system according to an embodiment is shown in FIG. 1. FIG. 1 is a schematic perspective view of the coordinated transport robot system of this embodiment. The coordinated transport robot system of this embodiment performs a coordinated transport of a transport object 30 such as a long and heavy object, and includes two robots 5a and 5b and position error absorption mechanisms 10a and 10b. The two robots 5a and 5b each include mobile units (such as independent-two-wheel carts, omnidirectional mobile carts, or legs) 6a and 6b for moving their own robots, and movement control units that drive and control the mobile units 6a and 6b, respectively. The position error absorption mechanisms 10a and 10b are fixed onto the robots 5a and 5b, respectively, and absorb position errors between the robots 5a and 5b and the transport object 30. The transport object 30 is placed or fixed onto the top panels of the position error absorption mechanisms 10a and 10b.

Figure 2A:
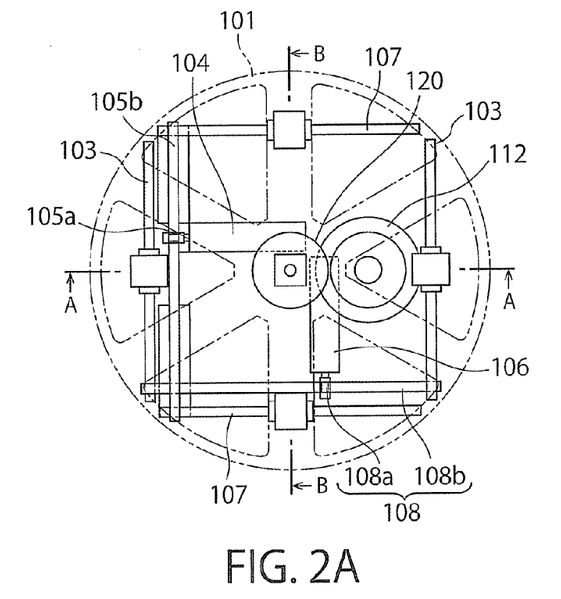
FIGS. 2A through 2D are diagrams showing a position error absorption mechanism.
Figure 2B:
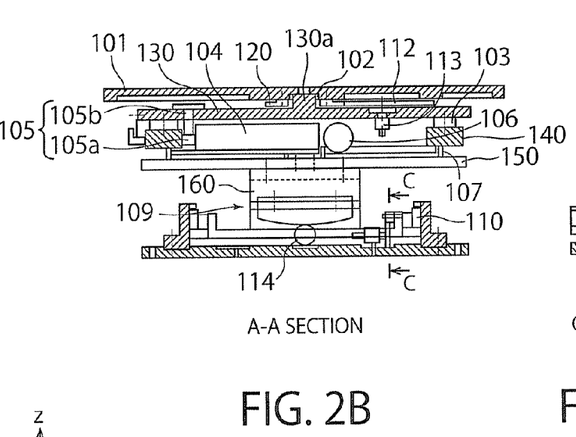
Figure 2C:
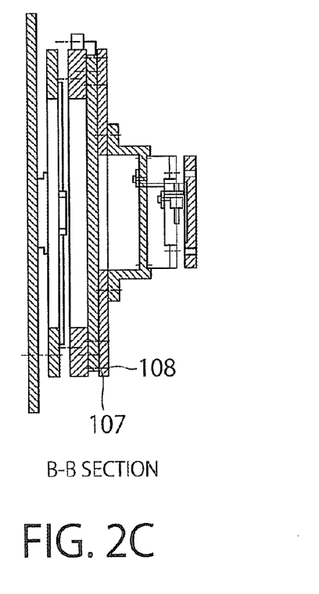
Figure 2D:
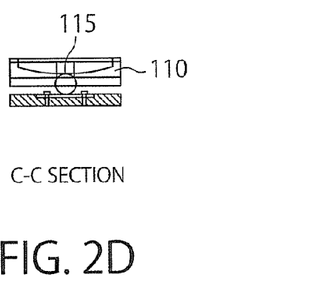

Position errors between each of the robots 5a and 5b and the transport object 30 have a total of six degrees of freedom: three degrees of freedom in the translational direction and three degrees of freedom in the rotational direction. In a case where the position error absorption mechanisms 10a and 10b are formed with active elements using actuators such as motors for all the degrees of freedom, the batteries in the mechanisms quickly run out, and the load on the coordinated transport robot system becomes larger. Therefore, in this embodiment, the load on the coordinated transport robot system is reduced by a combination with a passive element such as a spring, a damper, or a slider as much as possible. A specific example of the position error absorption mechanism 10a or 10b that is used in the coordinated transport robot system of this embodiment and is fixed onto the robots 5a or 5b is shown in FIGS. 2A through 2D. FIG. 2A is a top view of the position error absorption mechanism 10. FIG. 2B is a cross-sectional view taken along the section line A-A defined in FIG. 2A. FIG. 2C is a cross-sectional view taken along the section line B-B defined in FIG. 2A. FIG. 2D is a cross-sectional view taken along the section line C-C defined in FIG. 2B.

The position error absorption mechanism 10 of this specific example is designed so that a passive element performs a horizontal and spherical rotating operation, and an active element performs a translational moving operation through driving of a motor. In this position error absorption mechanism 10, a top panel 101 onto which the transport object 30 is to be placed or fixed is placed at the top. This top panel 101 is supported by a member 130 that is located below the top panel 101 and is capable of moving in the depth direction (the X-axis direction). A concavity is formed at the center portion of the bottom surface of the top panel 101 or the surface opposite from the surface onto which the transport object 30 is to be placed or fixed, and a bearing 102 is placed in the concavity. The member 130 has a boss 130a at its center portion. The inner ring of the bearing 102 is engaged with the boss 130a, and the outer ring of the bearing 102 is engaged with the top panel 101. That is, the top panel 101 is rotatable about the axis of the bearing 102 with respect to the member 130. The boss 130a may be fixed to the member 130 with a bolt or the like. A gear 120 is provided on the bottom surface side of the top panel 101 so as to rotate in synchronization with the top panel 101. This gear 120 is fixed to the top panel 101 with a bolt, and has a hole at the center portion, so that the boss 130a of the member 130 penetrates through the hole. In this specific example, six concave portions are formed in the bottom surface of the top panel 101 so as to reduce the weight of the top panel 101.

A member 140 that secures and supports motors 104 and 106 is provided below the member 130. A pinion 105a is attached to the end of the rotational shaft of the motor 104, and a rack 105b engaged with the pinion 105a is fixed to the member 130 with a bolt. The pinion 105a and the rack 105b constitute a rack/pinion mechanism 105. The member 130 becomes movable in the X-axis direction with respect to the member 140 by virtue of the motor 104 and the rack/pinion mechanism 105. The movement in the X-axis direction is movement along a linear guide 103 that is provided between the member 130 and the member 140.

In the position error absorption mechanism 10 of this specific example, a displacement transmitting gear 112 that meshes with the gear 120 is provided to detect the rotational position (the rotation quantity) of the top panel 101, and the central shaft of the gear 134 is attached to the member 130 via a bearing. A potentiometer 113 is provided at the end of the central shaft of the displacement transmitting gear 112.

A pinion 108a is attached to the end of the rotational shaft of the motor 106 fixed to the member 130, and a rack 108b engaged with the pinion 108a is fixed to a member 150 with a bolt. The member 150 is provided below the member 140. The pinion 108a and the rack 108b constitute a rack/pinion mechanism 108. By virtue of the motor 106 and the rack/ pinion mechanism 108, the member 150 becomes movable in the horizontal direction (the Y-axis direction) in FIG. 2B with respect to the member 140. The movement in the Y-axis direction is movement along a linear guide 107 that is provided between the member 140 and the member 150.

Figure 3:
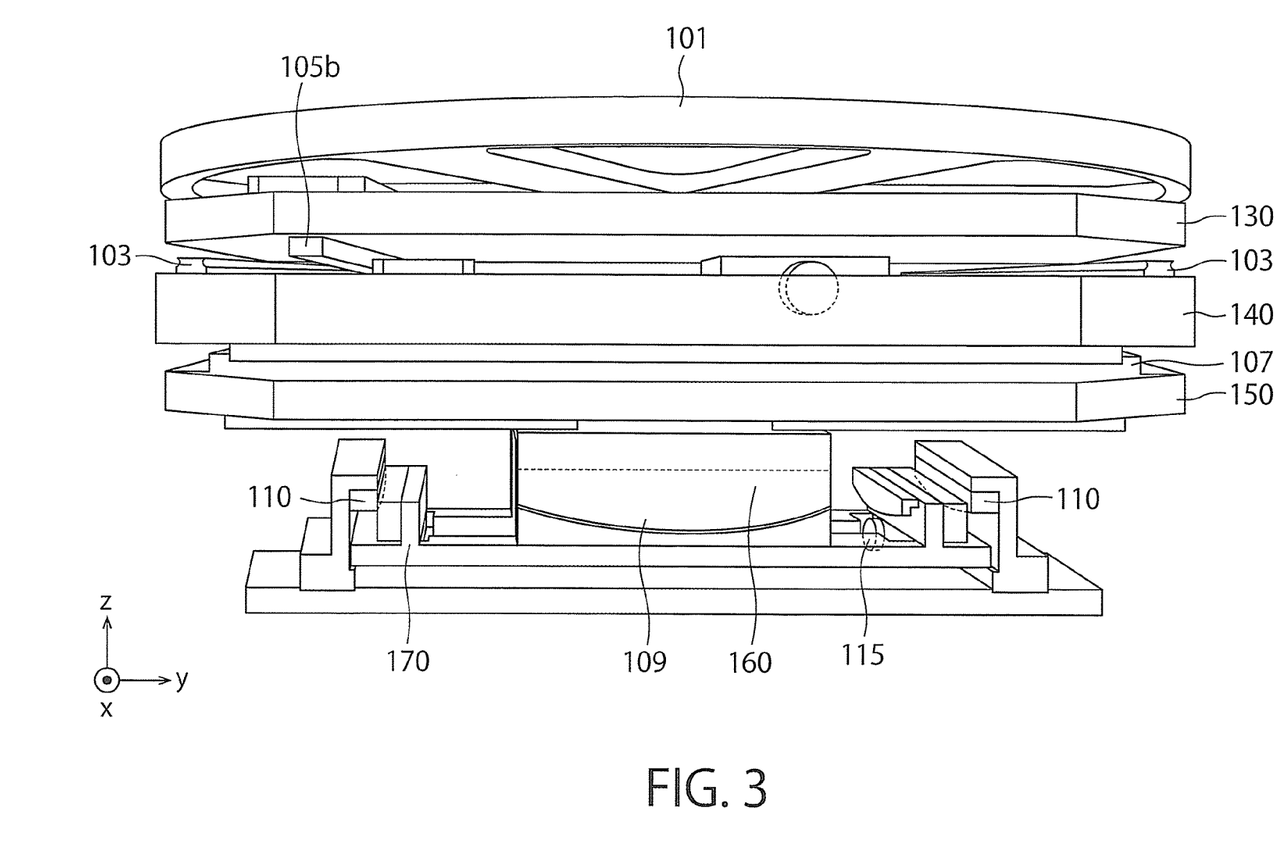
FIG. 3 is a perspective diagram showing gonio-stages.

Two gonio-stages 109 and two gonio-stages 110 are provided below the member 150. As shown in FIG. 3, the two gonio-stages 109 are located in positions that face each other, with the center of the top panel 101 being in the middle. The two gonio-stages 110 are arranged in a direction perpendicular to the direction in which the two gonio-stages 109 are arranged, and are located in positions that face each other, with the center of the top panel 101 being in the middle. As shown in FIGS. 2B and 3, the two gonio-stages 109 are engaged with a member 160 that is fixed to the member 150 with a bolt, for example, and has a U-shaped cross-section. As shown in FIG. 3, the gonio-stages 110 are engaged with a member 170 that is fixed to the gonio-stages 109.

Figures 4A, 4C:
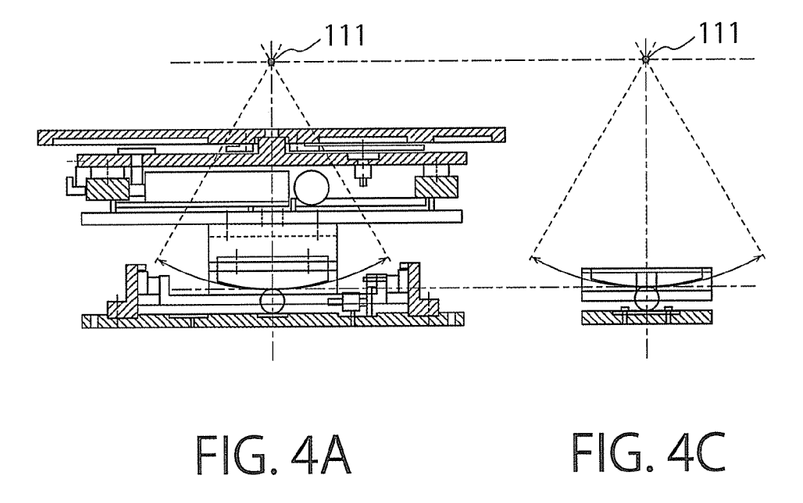
FIGS. 4A through 4C are cross-sectional diagrams for explaining the characteristics of the gonio-stages.
Figure 4B:
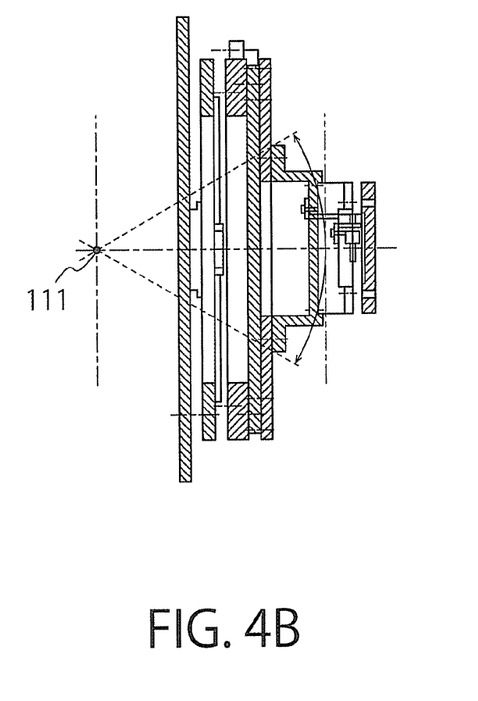

As shown in FIGS. 4A through 4C, the gonio-stages 109 and 110 are passive elements that can rotationally move objects in arcs with the same curvature. The gonio-stages 109 cause the member 160 to rotationally move in an arc about a first rotational axis (an axis parallel to the X-axis) provided above the gonio-stages 109, and the gonio-stages 110 cause the member 170 to rotationally move in an arc about a second rotational axis (an axis parallel to the Y-axis) provided above the gonio-stages 110. The first rotational axis and the second rotational axis intersect at a point 111. With this arrangement, the top panel 101 can be driven while isotropy is maintained with respect to external forces in every direction in the horizontal plane. Displacement measuring sensors (such as potentiometers) 114 and 115 are further mounted on the gonio-stages 109 and 110 so as to measure amounts of displacement from the initial positions.

Figure 5:
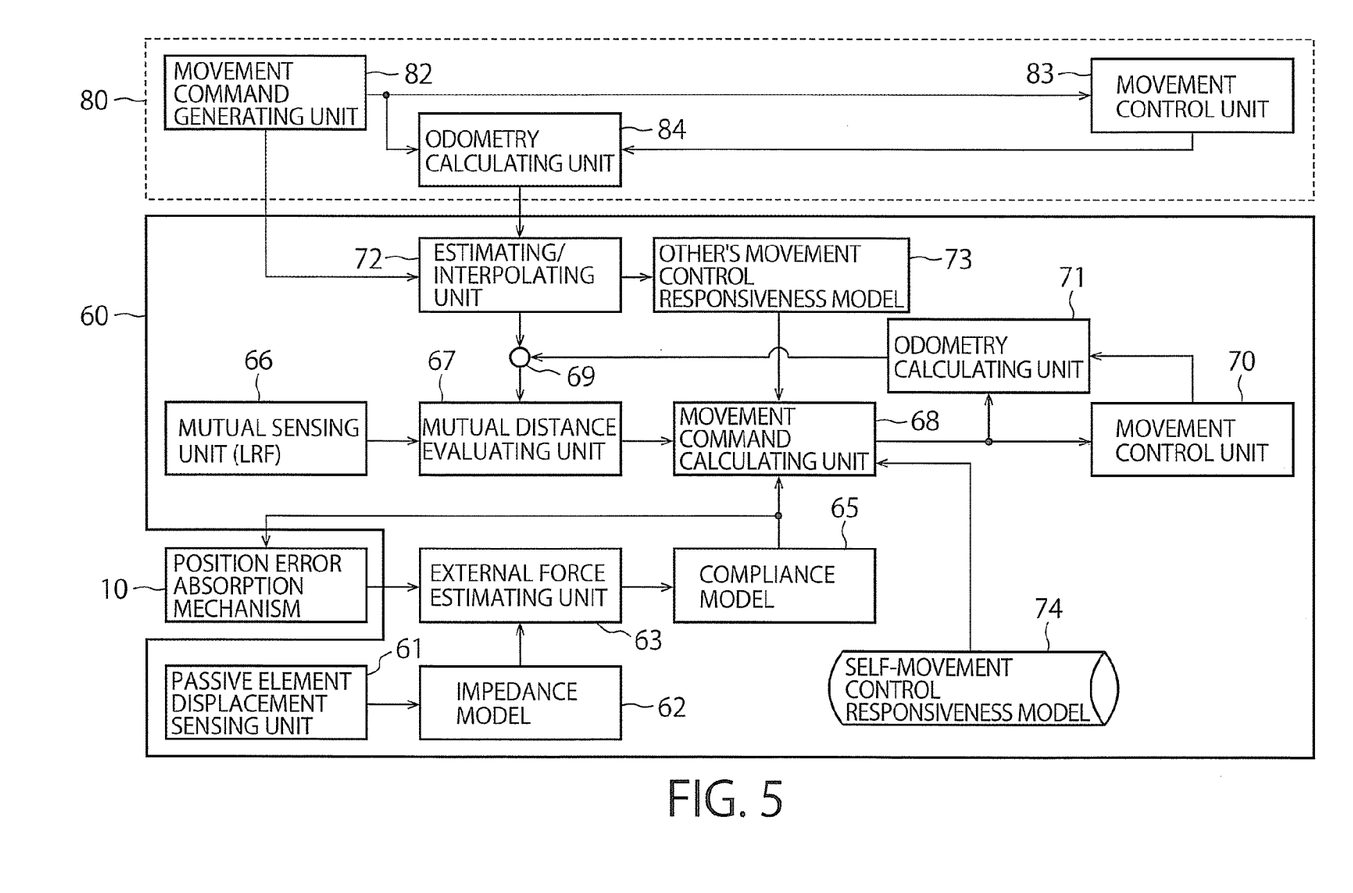
FIG. 5 is a block diagram for explaining a control operation of the coordinated transport robot system.

Referring now to the control block diagram shown in FIG. 5, a control operation of the coordinated transport robot system of this embodiment is described. In the description below, of the two robots 5a and 5b shown in FIG. 1, one robot, which is the robot 5a, for example, will be also referred to as the master robot, and the other robot 5b will be also referred to as the slave robot. The slave robot 5b includes a control unit 60 shown in FIG. 5, and the master robot 5a includes a control unit 80. Alternatively, the master robot 5a may include the control unit 60. In the description below, the master robot 5a includes the control unit 60.

The control unit 80 includes a movement command generating unit 82, a movement control unit 83, and an odometry calculating unit 84.

The control unit 60 includes a passive element displacement sensing unit 61, an impedance model 62, an external force estimating unit 63, a compliance model 65, a mutual sensing unit 66, a mutual distance evaluating unit 67, a movement command calculating unit 68, an adding unit 69, a movement control unit 70, an odometry calculating unit 71, an estimating/interpolating unit 72, and an other's movement control responsiveness model 73. The functions of the respective components of the control unit 60 and the control unit 80 will be described below along with explanation of the control operation.

A case where the master robot 5a and the slave robot 5b perform a coordinated transport of the transport object 30 such as a long and heavy object shown in FIG. 1 is now described. In this case, the transport object 30 is placed and fixed onto the top panel of the position error absorption mechanism 10a fixed onto the master robot 5a, and the top panel of the position error absorption mechanism 10b fixed onto the slave robot 5b.

First, a command is sent from the operator of the coordinated transport robot system to the movement command generating unit 82 of the master robot 5a. In accordance with the command, a movement command for moving the master robot 5a is sent from the movement command generating unit 82 to the movement control unit 83, and the movement control unit 83 drives and controls the mobile unit 6a (see FIG. 1) of the master robot 5a, so that the master robot 5a moves. The movement command generating unit 82 may store a preprogrammed command, and generate a movement command based on the stored command. In this case, there is no need to receive a command from the operator.

As the master robot 5a moves in the above manner, the slave robot 5b also moves via the transport object 30, and a coordinated transport is performed.

If a position error occurs while a coordinated transport is being performed, in the each position error absorption mechanisms 10, displacement occurs in the passive element with the highest responsiveness in the position error absorption mechanisms 10. The amount of the displacement is measured by the passive element displacement sensing unit 61. In accordance with the measured amount of the displacement, the external force acting on the robot including the passive element having the displacement is estimated by the external force estimating unit 63 using the virtual impedance model 62. The impedance model 62 is a model that assumes virtual inertia, viscosity, and elasticity, and estimates the force $\Delta f_i$ acting on the robot including the passive element having displacement based on the amount of the displacement. This impedance model is expressed by the following equation.

$$\Delta f_i = M_i d^2 x/dt^2 + D_i dx/dt + K_i dx/dt$$

Here, x represents the amount of displacement, dx/dt is the time subtraction of x, and $d^2x/dt^2$ is the time subtraction of dx/dt. $M_i$, $D_i$ and $K_i$ are impedance model parameters (hereinafter also referred to as the parameters) indicating the virtual inertia, the virtual viscosity, and the virtual elasticity of the impedance model, respectively.

The above mentioned parameters strongly depend on the dynamic characteristics of the passive element in the position error absorption mechanism 10 of the robot. Accordingly, the responsiveness to an external force can be estimated beforehand from the time-series variation (time response) of the displacement of the passive element with respect to a known external force. The impedance parameters that conform to the responsiveness to the external force are identified in the frequency domain, and the identified parameters are stored beforehand as a database.

Meanwhile, in the active element unit in each of the position error absorption mechanisms 10, an external force is also estimated by the external force estimating unit 63 based on the value of the current applied to the motors 104 and 106 shown in FIG. 2A. The difference between the value of the current in a steady state where any external force is not applied and the value of the current in a state where an external force is applied is multiplied by a torque constant, to estimate a force $\Delta f_m$. Based on the external force $\Delta f_i$ estimated with the use of the impedance model 62 and the force $\Delta f_m$, the external force estimating unit 63 estimates the external force $\Delta f$ acting on the entire robot by taking into account the coordinate transform due to the link structure of the robot.

The position correction amount of the entire robot is calculated with the virtual compliance model 65 so that the external force $\Delta f$ being applied becomes 0 in the compliance model 65. This compliance model 65 is a concept equivalent to the reciprocal of the impedance model 62, and is expressed by the following equation.

$$\Delta x = (\Delta f_i - M_c d^2 \Delta x/dt^2 - D_c d\Delta x/dt)/K_c$$

Here, $\Delta x$ represents the position correction amount, $d\Delta x/dt$ is the time subtraction of $\Delta x$, and $d^2\Delta x/dt^2$ is the time subtraction of $d\Delta x/dt$. $M_c$, $D_c$ and $K_c$ are compliance model parameters (hereinafter also referred to as the parameters) indicating the virtual inertia, the virtual viscosity, and the virtual elasticity of the compliance model 65, respectively.

The above parameters can be estimated beforehand as the responsiveness to an external force, like the impedance model parameters. Further, a signal for identification is input to the active element unit, and the time response inclusive of the dynamic characteristics of the transport object 30 placed on the robot can be measured from the time-series variation in the amount of displacement at that time. In this manner, the compliance model parameters for compensating an estimated error in the dynamic characteristics of the object placed on the robot can be estimated online during a transfer operation.

Based on the calculated position correction amount, the movement command calculating unit 68 calculates a robot movement command. At this point, the robots 5a and 5b mutually sense the distance and the direction between the robots 5a and 5b by using a sensor such as the mutual sensing unit (such as a laser range finder (LRF)) 66, and calculates such a movement command as to maintain the distance and the direction. Based on the movement command, the movement control unit 70 controls the robots 5a and 5b. At this point, the robot calculates the value of a command to an actuator such as a motor in accordance with dynamics based on the form of the mobile units such as independent-two-wheel carts, omnidirectional moving carts, or legs.

In a case where the mutual distance between the robots 5a and 5b cannot be measured by a sensor, on the other hand, each of the robots 5a and 5b needs to estimate a self-location from the time-series data of command values stored therein. In this case, the odometry calculating unit 71 provided in the robot estimates the self-location (odometry) of the robot by using an integral of the movement command, the positional information from the movement control unit 70, and the value of a current feedback. In this manner, the degree of deviation (the position deviation) from a target orbit is estimated by the mutual distance evaluating unit 67, and an amount of correction is added to the movement command.

Further, a movement command may be communicated between the robots 5a and 5b. In this case, the master robot 5a receives a movement command or a self-location from the slave robot 5b, and the estimating/interpolating unit 72 takes into account the time lag or missing in the communication. At this point, a prediction is performed by a shaping or estimating process using a filter, as appropriate. In accordance with the estimated movement command to the slave robot 5b, the mutual distance from the slave robot 5b is evaluated, and a movement command to the master robot 5a is generated.

Figure 6A:
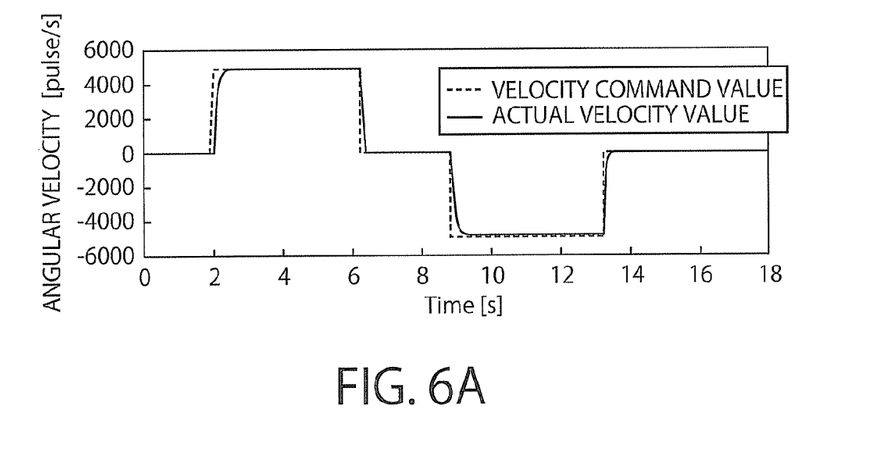
FIGS. 6A and 6B are waveform charts showing the values of movement commands to the motor that drives the respective wheels of mobile carts, and the values of actual velocities.
Figure 6B:
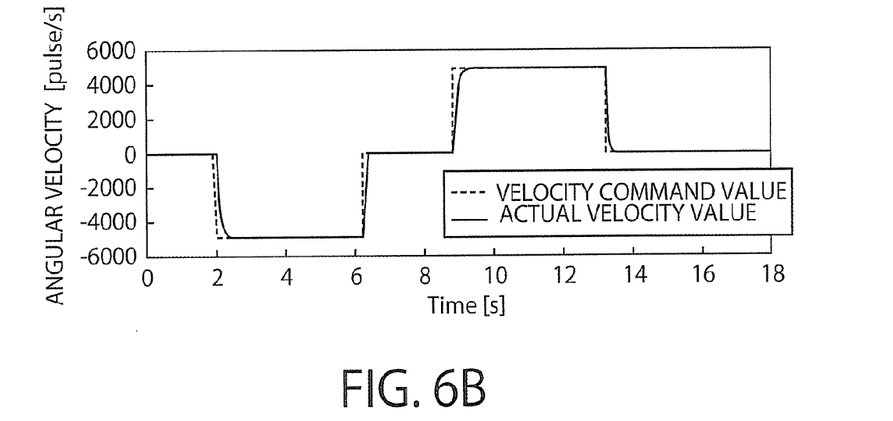

An actual response to a command value is slow, which is true not only in robots. FIGS. 6A and 6B are waveform charts showing the values of velocity commands (indicated by dashed lines) to the motor that drives the respective wheels of the mobile carts, and the values of actual velocities (indicated by solid lines). FIG. 6A is a waveform chart showing a case where the motor changes from a positive angular velocity to a negative angular velocity. FIG. 6B is a waveform chart showing a case where the motor changes from a negative angular velocity to a positive angular velocity. As can be seen from FIGS. 6A and 6B, there are following lags. In reality, there are even longer lags due to friction against the road surface or the inertia of the load.

The time lags are turned into a model and are taken into account in a correction amount calculation so that a further increase in accuracy can be expected in estimating a position error. The value of the response to the value of the movement command in the robot is stored as a self-movement control responsiveness model 74 in a database. The self-movement control responsiveness model 74 of the robot prepares a movement command value for identification in advance, and performs a test operation, with the transport object 30 being placed on the robot. At this point, the value of the movement command for identification is input, and the response signal to the movement command value is measured. In this manner, the self-movement control responsiveness model 74 that takes into account the dynamic characteristics of the transport object 30 can be identified.

Also, the time-series data of movement command values acquired through communications with the other robot and the time-series data of the self-location are stored as the other's movement control responsiveness model 73 in a database. A simple example of the responsiveness model used herein may be a first-order lag model expressed by the following equation.

$$y(t)=1-\exp(-x(t)/T)$$

Here, x(t) represents the time-series data of movement command values, y(t) represents the time-series data of actual velocities, and T represents the time constant. The time constant T is identified from a measured value of a command and an actual value, and is then stored in the database. Alternatively, a second-order model may be assumed, as in the impedance model or the compliance model. The second-order model G expressed in a transfer function form using a variable s in a Laplace domain is as follows.

$$G=1/(Ms^2+Ds+K)$$

Here, M, D, and K are parameters of a second-order response model.

The calculations for identifying the self-movement control responsiveness model 74 and the other's movement control responsiveness model 73 are not necessarily performed by a computer mounted on the robot. The time-series data of movement command values and response signals are transmitted to an external computer through communications, and the calculations for identification are performed in the external computer. The parameters obtained as a result of the calculations are transmitted to the robot, and are used in the responsiveness models 74 and 73.

As described so far, according to this embodiment, coordinated transports of long and heavy objects can be performed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A robot system, comprising:
   first and second robots each including a mobile unit and a control unit configured to control the mobile unit;
   first and second mechanisms provided on the first and second robots, respectively, each of the first and second mechanisms including a panel onto which an object to be placed, a first element unit configured to rotationally move the panel in a first direction and detect an amount of displacement of rotational movement, and a second element unit configured to translationally move the panel in the first direction and detect an amount of displacement of translational movement;
   an estimating unit configured to estimate an external force from the amount of displacement detected by the first element unit and estimate respective external forces acting on the first and second robots based on the amount of displacement detected by the second element unit, and the external force estimated by the first element unit; and
   a first calculating unit configured to calculate respective position correction amounts of the first and second robots to make an external force substantially zero, the external force being estimated by the estimating unit and calculate movement commands to the first and second robots based on the position correction amounts;
   wherein the control units of the first and second robots control the respective mobile units based on the respective movement commands calculated by the first calculating unit.

2. The system according to claim 1, further comprising:
   a sensing unit measuring a distance and a direction between the first and second robots;
   a second calculating unit estimating and calculating a self-location based on values of integrals of movement control amounts of the first and second robots and position information from the control units; and
   an evaluating unit estimating a mutual distance between the first and second robots based on the self-location calculated by the second calculating unit and the distance and the direction between the first and second robots calculated by the sensing unit,
   wherein the first calculating unit calculates the movement commands to the first and second robots based on the position correction amounts and the mutual distance estimated by the evaluating unit.

3. The system according to claim 1, further comprising:
   a movement control responsiveness model configured to approximate responsiveness from the movement commands and actual movement amounts of the first and second robots,
   wherein the first calculating unit corrects the movement commands by using the predicted values of movement amounts calculated by the movement control responsiveness model.

4. The system according to claim 3, wherein
   the movement control responsiveness model is a self-movement control responsiveness model of the first and second robots, and
   the self-movement control responsiveness model is obtained by measuring a response signal generated when the object is placed on the robot system and a movement command value for identification is given to one of the first and second robots.

5. The system according to claim 3, wherein,
   the movement control responsiveness model is an other's movement control responsiveness model of the other robot as opposed to one robot of the first and second robots, and
   the other's movement control responsiveness model is obtained from time-series data of a movement command value for the other robot and a self-location of the one robot.

6. The system according to claim 1, wherein each of the first and second mechanisms includes:
a first member provided below the panel;
a third mechanism enabling the first member to rotate with respect to the panel about a center of the panel;
a second member provided below the first member;
a third member provided below the second member;
a fourth mechanism causing the first member to translationally move with respect to the second member in a second direction in the first direction;
a fifth mechanism causing the third member to translationally move with respect to the second member in a third direction perpendicular to the second direction in the first direction;
a fourth member fixed to the third member;
a first pair of gonio-stages causing the fourth member to rotate in an arc about a first rotational axis located thereabove, the first pair of gonio-stages being engaged with the fourth member and facing each other;
a fifth member fixed to the first pair of gonio-stages; and
a second pair of gonio-stages causing the fifth member to rotate in an arc about a second rotational axis that is provided thereabove and intersects the first rotational axis at one point, the second pair of gonio-stages being provided on the robot having the corresponding one of the first and second mechanisms, the second pair of gonio-stages being engaged with the fifth member and facing each other in a direction perpendicular to a direction in which the first pair of gonio-stages are arranged.

7. A robot system, comprising:
a robot including a mobile unit and a control unit configured to control the mobile unit;
a first mechanism provided on the robot, the first mechanism including a panel onto which an object to be placed, a first element unit configured to rotationally move the panel in a first direction and detect an amount of displacement of rotational movement, and a second element unit configured to translationally move the panel in the first direction and detect an amount of displacement of translational movement;
an estimating unit configured to estimate an external force from the amount of displacement detected by the first element unit and estimate an external force acting on the robot based on the amount of displacement detected by the second element unit, and the external force estimated by the first element unit; and
a first calculating unit configured to calculate a position correction amount of the robot to make an external force substantially zero, the external force being estimated by the estimating unit and calculate movement command to the robot based on the position correction amount;
wherein the control units of the robot control the mobile unit based on the movement command calculated by the first calculating unit.

8. The system according to claim 7, further comprising:
a second calculating unit estimating and calculating a self-location based on values of integrals of movement control amount of the robot and position information from the control unit;
wherein the first calculating unit calculates the movement commands to the robot based on the position correction amount.

9. The system according to claim 7, further comprising:
a movement control responsiveness model configured to approximate responsiveness from the movement command and actual movement amount of the robot,
wherein the first calculating unit corrects the movement commands by using the predicted value of the movement amount calculated by the movement control responsiveness model.

10. The system according to claim 9, wherein
the movement control responsiveness model is a self-movement control responsiveness model of the robot, and
the self-movement control responsiveness model is obtained by measuring a response signal generated when the object is placed on the robot system and a movement command value for identification is given to the robot.

11. The system according to claim 7, wherein the first mechanism includes:
a first member provided below the panel;
a second mechanism enabling the first member to rotate with respect to the panel about a center of the panel;
a second member provided below the first member;
a third member provided below the second member;
a third mechanism causing the first member to translationally move with respect to the second member in a second direction in the first direction;
a fourth mechanism causing the third member to translationally move with respect to the second member in a third direction perpendicular to the second direction in the first direction;
a fourth member fixed to the third member;
a first pair of gonio-stages causing the fourth member to rotate in an arc about a first rotational axis located thereabove, the first pair of gonio-stages being engaged with the fourth member and facing each other;
a fifth member fixed to the first pair of gonio-stages; and
a second pair of gonio-stages causing the fifth member to rotate in an arc about a second rotational axis that is provided thereabove and intersects the first rotational axis at one point, the second pair of gonio-stages being provided on the robot having the first mechanism, the second pair of gonio-stages being engaged with the fifth member and facing each other in a direction perpendicular to a direction in which the first pair of gonio-stages are arranged.

* * * * *